United States Patent
Totaro et al.

(10) Patent No.: US 10,770,046 B2
(45) Date of Patent: Sep. 8, 2020

(54) INTERACTIVE PERCUSSIVE DEVICE FOR ACOUSTIC APPLICATIONS

(71) Applicant: Oddball Studios Ltd, London (GB)

(72) Inventors: Pasquale Totaro, London (GB); Nathan Webb, London (GB)

(73) Assignee: ODDBALL STUDIOS LTD, London (GB)

(*) Notice: Subject to any disclaimer, the term of this patent is extended or adjusted under 35 U.S.C. 154(b) by 0 days.

(21) Appl. No.: 16/440,271

(22) Filed: Jun. 13, 2019

(65) Prior Publication Data

US 2019/0385576 A1    Dec. 19, 2019

(30) Foreign Application Priority Data

Jun. 14, 2018   (IT) .......................... 102018000006309

(51) Int. Cl.
   *G10H 1/00*   (2006.01)
   *G10H 1/32*   (2006.01)

(52) U.S. Cl.
   CPC .......... *G10H 1/0066* (2013.01); *G10H 1/0008* (2013.01); *G10H 1/32* (2013.01); *G10H 2220/395* (2013.01); *G10H 2220/401* (2013.01)

(58) Field of Classification Search
   CPC ...... G10H 1/0066; G10H 1/0008; G10H 1/32; G10H 2220/395; G10H 2220/401
   USPC ........................................................ 84/645
   See application file for complete search history.

(56) References Cited

U.S. PATENT DOCUMENTS

| | | | | |
|---|---|---|---|---|
| 4,127,053 A | * | 11/1978 | Cohen | G10D 13/06 |
| | | | | 446/422 |
| 4,577,865 A | * | 3/1986 | Shishido | A63B 43/00 |
| | | | | 473/446 |
| 5,375,839 A | * | 12/1994 | Pagani | A63B 43/00 |
| | | | | 446/409 |
| 5,445,375 A | * | 8/1995 | Sweeny | A63B 43/00 |
| | | | | 273/146 |
| 5,526,326 A | * | 6/1996 | Fekete | A63B 43/00 |
| | | | | 368/10 |
| 5,779,576 A | * | 7/1998 | Smith, III | A63B 65/00 |
| | | | | 473/570 |
| 5,810,685 A | * | 9/1998 | Willner | A63B 43/00 |
| | | | | 273/335 |
| 6,578,527 B1 | * | 6/2003 | Mathers | A01K 15/025 |
| | | | | 119/707 |

(Continued)

FOREIGN PATENT DOCUMENTS

| | | |
|---|---|---|
| CN | 202909457 U | 5/2013 |
| ES | 2629988 A1 | 8/2017 |

(Continued)

OTHER PUBLICATIONS

Search Report for Italian Application No. 102018000006309 dated Dec. 17, 2018.

*Primary Examiner* — David S Warren
*Assistant Examiner* — Christina M Schreiber
(74) *Attorney, Agent, or Firm* — Pearne & Gordon LLP

(57) ABSTRACT

Percussive interactive device characterized in that it is composed of an external polyhedric case of deformable material and of an internal case housing an electronic device, whose purpose is to detect external forces applied on said device and to transmit the data collected, once converted into electronic data for audio applications, to an external device used to process and emit sound.

16 Claims, 5 Drawing Sheets

(56) References Cited

U.S. PATENT DOCUMENTS

| | | | |
|---|---|---|---|
| 9,545,542 B2* | 1/2017 | Binder | A63B 69/0053 |
| 9,764,201 B2* | 9/2017 | Binder | A63B 69/0053 |
| 2003/0109338 A1* | 6/2003 | Oister | A63B 71/06 |
| | | | 473/570 |
| 2005/0145090 A1* | 7/2005 | Adognravi | G10D 13/06 |
| | | | 84/410 |
| 2006/0174749 A1* | 8/2006 | Lerner | G10D 13/22 |
| | | | 84/419 |
| 2007/0032318 A1* | 2/2007 | Nishimura | A63B 69/3632 |
| | | | 473/570 |
| 2007/0283797 A1* | 12/2007 | Crawford | G10D 13/02 |
| | | | 84/411 R |
| 2008/0283311 A1* | 11/2008 | Li | B62D 37/00 |
| | | | 180/65.1 |
| 2009/0272249 A1* | 11/2009 | Glowacki | G10D 13/06 |
| | | | 84/410 |
| 2011/0237367 A1* | 9/2011 | Kodama | A63B 43/06 |
| | | | 473/570 |
| 2012/0244969 A1* | 9/2012 | Binder | A63B 21/0055 |
| | | | 473/570 |
| 2016/0030854 A1* | 2/2016 | Shaanti | A63H 33/048 |
| | | | 446/85 |
| 2018/0158440 A1* | 6/2018 | Kroehling | G10H 1/32 |
| 2018/0330701 A1* | 11/2018 | Yudasaka | G10H 1/32 |
| 2019/0385576 A1* | 12/2019 | Totaro | G10H 1/0066 |

FOREIGN PATENT DOCUMENTS

| | | | | |
|---|---|---|---|---|
| FR | 2986162 A1 | 8/2013 | | |
| GB | 2454518 A * | 5/2009 | | A63H 33/18 |
| GB | 2454518 A | 5/2009 | | |
| WO | 2015051753 A1 | 4/2015 | | |

* cited by examiner

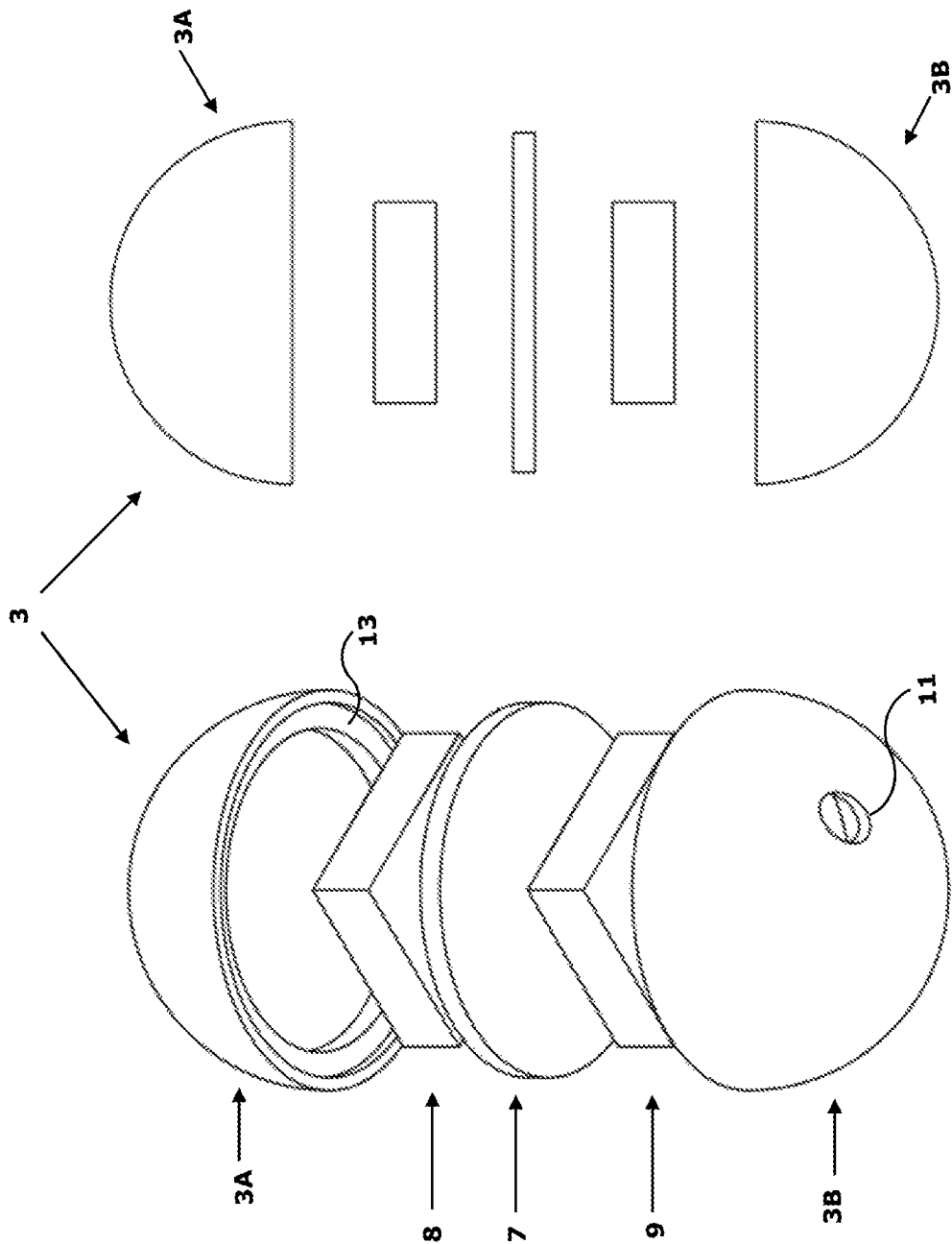

INTERACTIVE PERCUSSIVE DEVICE FOR ACOUSTIC APPLICATIONS

FIELD OF THE INVENTION

The present invention refers to a deformable portable device, in particular an interactive device, capable of absorbing external stresses and translating them, via an audio processing and transmission system, into sound impulses.

STATE OF THE ART TECHNOLOGY

Technological progress, among the various innovations aimed at the solution of practical problems, led to the development of methods, services and products that fulfill an individual's needs. In particular, research has aimed to develop and manufacture flexible electronic devices to accomplish the most diverse purposes, able to satisfy an expressed need or will by the user through a given command.

In this context, HID (Human Interface Device) devices have been developed to interact directly with the user, with a undetectable or acceptable latency, and designed to be able to detect a command, performed by voice or by a user's physical action, for example a touch on a keyboard or on a touch-screen, or a movement of a limb, and consequently to interpret it instantaneously and return a recognizable answer to the same user via a digital interactive interface.

The hi-tech industry is today particularly active in the development of interactive devices incorporated both in vehicles and in most various handling instruments of common use, so much that they have now become an integral and significant part of life in today's society.

In particular, interactive and interconnected devices have been developed, such as game controllers, aimed at translating specific motor activities of the user in virtual movements, with both high precision and simplicity of use and allowing an absolute involvement of the user.

Moreover, the introduction of psychological studies in this technological field has led to the development of solutions that are closer to the particular tastes of the customers. We have therefore come to develop devices that process data acquired from a user's movements to analyze a behavior and consequently indicate the correct motion and improve a specific technique.

To realize these devices properly, electronics components have been implemented in objects and tools that are used in various sports, like specific shoes for various sports disciplines, skis, tennis rackets, baseball bats, golf balls and various models of balls used in football, basketball, volleyball, American football, water polo and so on.

In particular, there are several balls equipped with electronic devices inserted inside the cavity generally filled with air, or more preferably in the leather or plastic panels or in the layers that make up the outer casing. Such electronics devices usually includes sensors, various hardware and software interfaces that allow for connectivity to a remote interactive device, to which the data measured by the sensors can be collected and processed to provide a complete analysis of the effective performance of the user, thus helping the athlete to enhance his agonistic intelligence. The digital information sent by the sensors offer the possibility to accumulate experience from particular athletic gestures and to push one's own physical limits, technique and talent and make individual performances more effective.

On the other hand, such interactive devices of known technique have a functionality that is exclusively focused on the analysis of collected data, requiring at least one further measurement tool of reference in order to be able to determine the position e the trajectory of a ball.

In fact, current interactive instruments subject to external stresses, which are voluntarily caused by the user, are designed to process the results obtained by interaction between the movement executed by the user and the device itself, for example the scores established by the shots or shots made on the ball, not exploiting the same solicitations for other objectives that can offer any creative activity beyond the concept of mere analysis of the effects obtained from these solicitations.

On the basis of these devices, another type of interactive devices has been developed, which are specifically designed for the purpose of reproducing a sound in response to a movement. Several are the devices developed for this purpose, but they are practically able to only create a sound, and not capable to stimulate the user's skills through a truly creative usage of such device in the field of music.

In particular, from the natural archetypal gesture of repeatedly throwing a ball to the ground, being an act of coordination and of strong rhythmic nature, we can ascertain that, if a musical note is associated with every interaction with a ball, there is an opportunity to exploit the particular rhythms obtained for a creative activity. In this way, from a simple series of interactions it is possible to create, thanks to the user's skills and creativity, a personal musical composition. In order to be more comprehensive, it is necessary to highlight that the term "interaction" may refer to bouncing, catching, shaking, spinning, squeezing, altitude, position, direction etc. of the ball.

Nonetheless, there are no percussion instruments or electronic music instruments available today that are able to translate a series of stresses and deformations due to impact, shaking, deformation and bounce of a ball in a reproduction of musical sounds diversified by volume, pitch and various effects, thus composing a musical work that is created by the user due to the particular rhythm achieved through the application of mechanical forces on the ball.

SUMMARY DESCRIPTION OF THE INVENTION

The objective of the present invention is to propose a system that is able to transform into audio pulses the electronic data obtained, by transduction, from any external stress, for example any impact applied to a portable elastic body, and to send said data in real time—or with acceptable latency—to a remote interactive processing system, in order to obtain a univocal transformation of the obtained signal into different sounds, tones passages and dynamic modulations produced according to the different speeds, angles, intensity of the impact, and so on, applied to the elastic body by the user.

This goal is achieved through a percussive interactive device characterized by the fact that is composed of a polyhedric external shell of deformable material and of an internal shell containing an electronic device capable of detecting external stresses and transmitting all the information collected, once translated into electronic data for audio application, to an interactive remote device capable of elaborating the data received and reproducing sound. The subordinate claims describe preferential characteristics of the invention.

BRIEF DESCRIPTION OF THE DRAWINGS

Further characteristics and advantages of the invention are better described in the following detailed description of a preferred manifestation, given as a pure example and non-limited to the given example, and illustrated in the attached drawings, in which:

FIG. 2 is a perspective view of the open inner casing and its contents in a preferred physical configuration according to the present invention;

FIG. 3 is a plan view of the open inner casing and its contents of a preferred physical configuration according to the present invention;

DETAILED DESCRIPTION OF THE PREFERRED FORM OF IMPLEMENTATION

Figure 1:
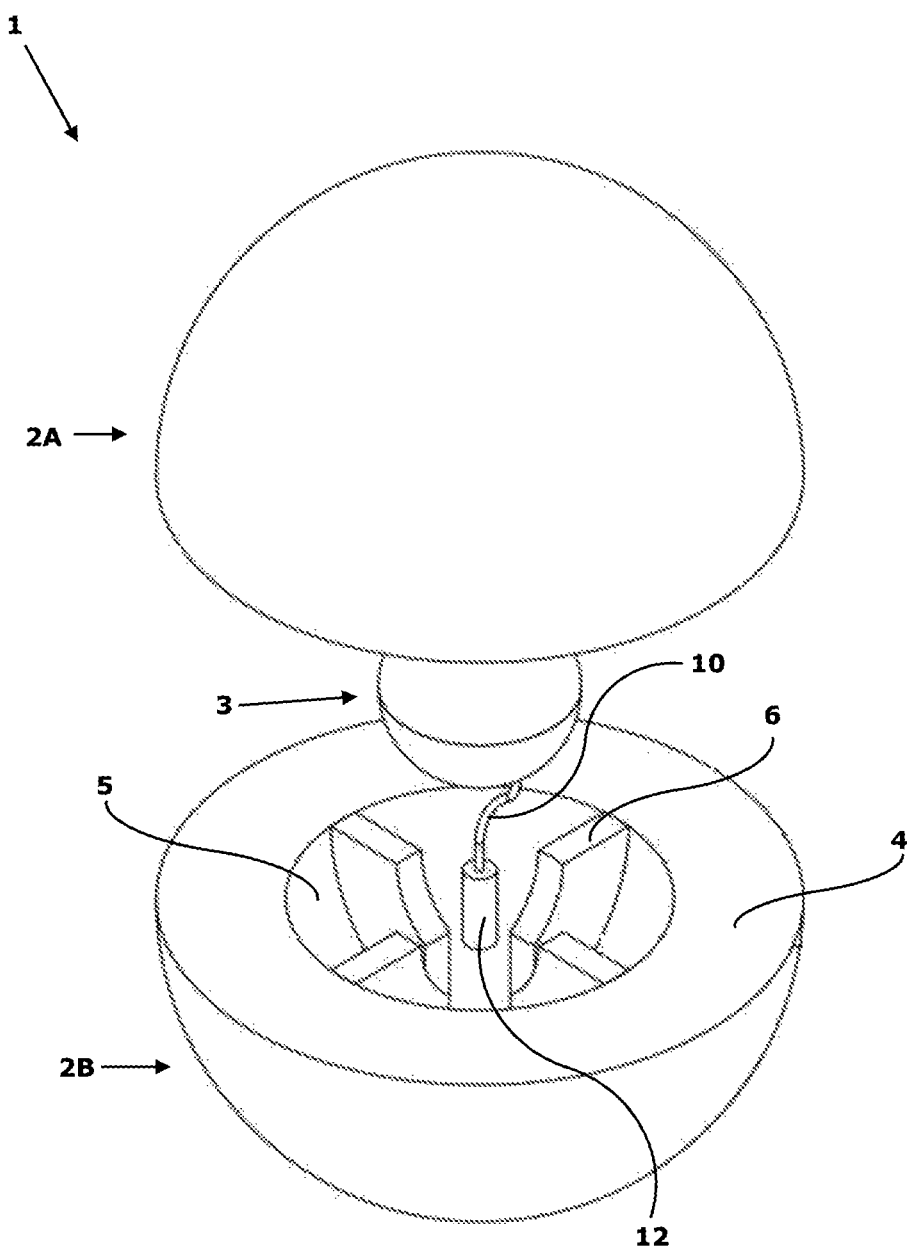
FIG. 1 is a perspective view of the open outer envelope and its contents in a preferred physical configuration according to the present invention.
Figure 5:
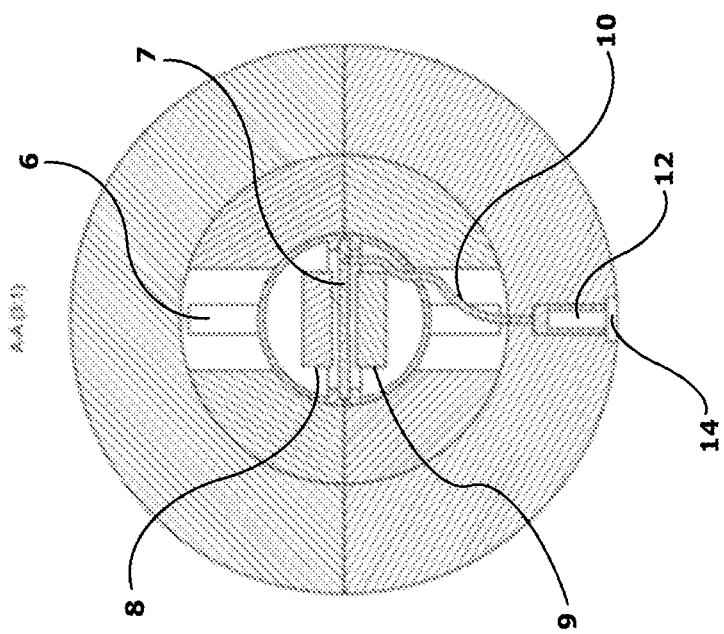
FIG. 5 is a sectional view along the plane A-A of a preferred physical configuration according to the present invention.
Figure 4:
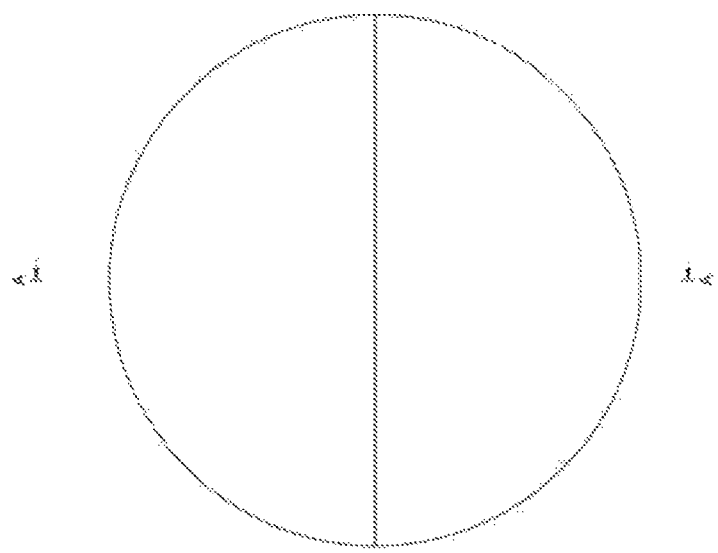
FIG. 4 is a plan view of the outer envelope of a preferred physical configuration according to the present invention.

FIG. 1 shows a percussive interactive device 1 composed of an outer casing 2 of spherical shape and of deformable material, which houses an electronic apparatus inside provided with appropriate software programming, as it will be clearly understood from the following description. Internally an inner casing 3 is arranged, as a support and retention of the electronic equipment; both enclosures 2,3 are divisible into two symmetrical halves.

Said outer casing 2 consists of an elastomer with high elasticity, in particular a rubbery substance with characteristics suitable for rebounding, for example silicone, polyurethane, polypropylene, polyvinylchloride and polybutadiene. If necessary, the rubber substance is added with particular substances, for example plasticizers, to make it even more elastic and suitable for rebounds, with an appropriate return coefficient for the correct functioning of the present invention. The thickness 4 between the outer surface and the inner surface of solid material is close to one third of the diameter of the device 1, for example 30 mm. The inner wall of the outer casing 2 is shaped to enclose an empty cavity 5 of a spherical shape. The two elements 2A, 2B which make up the outer casing 2 are clamped by means of a system with a stable engagement, typically screwed or interlocked or by gluing, to obtain a hermetic sealing of the outer casing 2. Said inner casing 3 is permanently coupled, using glue, to the ribs system 6 of the frame present in the cavity 5.

Inside the cavity 5 a series of said internal appendages 6 part of the outer casing 2 are arrange in order to form a frame system to support the inner casing 3 and are sized so that a gap is provided between them, there are no gaps between the lower ribs 6 and the corresponding upper ribs 6 when the two portions 2A, 2B of the outer casing 2 are joined together and the space required for accurately housing the inner casing 3 is provided.

The inner casing 3 is made of a plastic material, normally more rigid than the material of the outer casing 2. Said inner casing 3 takes on a spherical shape with an inner cavity, presenting a thickness of solid material much lower than the thickness 4 of the outer casing 2. Said inner casing 3 acts as a protective shell for containing and protecting the electronic core 7 of the present invention.

Lighting elements are provided, for example LED (Light Emitting Diode), in the device 1, preferably in the cavity 5 in which the inner casing 3 is mounted, electrically connected to the internal circuitry 7. In this case, the material of the outer casing 2 is composed of transparent or semi-opaque material, to guarantee the vision of the light-emitting elements through the surface of the outer casing 2.

Potentially, it is not excluded that the material of the outer casing 2 has an opaque surface. In this case, a suitable orifice is provided on the external wall to allow the emission of the light produced by at least one LED.

The electronic part comprises of a printed circuit board assembly (PCB 7), and two batteries 8,9 located respectively close to the upper and bottom surface of the electronic board PCBA 7 and both electrically connected to the said electronic board 7. Said electronic card 7 has a circular plan for housing in correspondence with an undercut 13 formed at the circular base of the two hemispheres 3A, 3B which constitute the inner shell 3. The two elements 3A, 3B are joined by mechanical joint and/or by gluing.

The batteries 8,9 are of conventional type and of appropriate voltage in order to power the electronic board 7. An electric connection cable 10 of appropriate length is connected to the printed circuit 7, coming out of a slot 11 located on the lower surface of the inner casing 3, at the end of which there is a connector 12. The circuit board 7 therefore has a circuit part used for charging the batteries 8,9 connected to the electric cable 10. The connector 12 is installed at a slot 14 of the outer casing 2 for connection to a remote interactive device. Said connector 12, equipped with a USB interface port (Universal Serial Bus), for example Micro-USB, is universal ly compatible and capable to connect, through a special external cable, to various interactive devices, for example camera, video camera, smartphone, tablet, external HD, TV, PC, laptop, MP3/MP4, iPod, iPad. A USB port is used to charge the batteries 8 and 9, and to transmit data between the software installed on the electronic board 7 and the related application software present in the remote interactive device. On the PCBA 7, various electronic measuring sensors are integrated, including a three-axis gyro X, Y, Z, a three-axis accelerometer X, Y, Z, possibly other accelerometers, and a magnetometer, mounted inside the shell 3, and at least one force/static pressure.

Alternatively, it is possible to apply a sensor to a point of the cavity 5 of the outer casing 2, for example using deflection sensors or strain gauges (Strain Gauges). Preferably, six extensometers are applied to the X, Y, Z axes, in particular two for each axis and arranged symmetrically, but the possibility of using more deformation sensors applied inside the cavity 5 is not excluded. Other sensors such as proximity, luminosity and altimeter sensor can also be included.

Near the slot 14 of the element 2B of the outer casing 2, an LED is installed, connected to the electronic card 7, which warns of the charging state of the batteries 8,9. Potentially, said LED is installed inside the connector 12 or in an orifice different from the slot 14.

In addition, a CPU LED is provided, connected to the electronic board 7, installed in the slot 14 or directly in the connector 12 or in a suitable orifice.

All measurement sensors are built with MEMS (Micro Electro-Mechanical Systems) or NEMS (Nano Electro-Mechanical Systems) technology or other technology applied to measurement sensors and small electronic transducers. The measured measurements are therefore converted into analogue signals. Subsequently, said signals are transformed into digital data through analog-digital converters (ADC), amplified by suitable amplifying circuits, filtered from possible noise signals, processed by a microcontroller and, once treated by a well-defined modulation and packaged into digital data, sent to the transmission antenna.

The printed circuit 7 has all the electronic elements necessary to contain and execute an algorithm useful for processing the data received from the sensors and transmitting them via wireless connectivity technology using an integrated transmitter-receiver module of Bluetooth technology, in particular BLE module (Bluetooth Low Energy) of known technique, for the wireless connection to an electronic remote processing and interactive device, for example smartphones, tablets, TV, PC, laptop, iPod, iPad, car, interactive Home Sound System. In general, said remote interactive device must be able to install and process the information coming from the device of the present invention and must be equipped with at least one memory, a display, a data transmission system in Bluetooth technology, outputs, by wire or wirelessly, for connection to sound emitting devices, such as headsets, speakers, a stereo system, and possibly access to the Internet, for a potential use of interaction and sharing tools by the members of a virtual community.

From a dimensional point of view, the outer casing 2 has a diameter between 70 mm and 125 mm, preferably 75 mm.

Moreover, the thickness 4 between the outer surfaces 2 and the inner surface 3, of solid material, is about ⅓ of the diameter of the device 1.

The size of the electronic board 7 and of the batteries 8, 9 determines the volume of said inner casing 3. Generally, the electronic board 7 has a diameter of a few tens of millimeters, for example 20 mm. It is not excluded that an electronic card 7 of smaller dimensions is used. The inner shell 3 has a diameter slightly greater than the diameter of the board 7, for example 24 mm.

The device according to the invention is suitably provided with a software component structured in two parts:

1. A firmware program, comprising a sequence of instructions integrated into the electronic board hardware 7 to receive the signals sent by the transducers of the various measurement sensors, amplify them by means of special integrated amplifiers, analyze them and send them to the transmitting system via Bluetooth, to execute the control signals received from the interactive percussive via Bluetooth communication or via the transmission/charging cable 10 and to manage the recharging of the batteries 8.9. In general, the purpose of the firmware is to start the electronic board 7 and the various measurement sensors and allow the electronic board 7 to interact with other hardware components through the implementation of a communication protocol, for example Bluetooth, and through the programming interface, described below. Finally, the firmware update of the electronic board 7 is carried out via a Bluetooth connection or via a transmission/charging cable 10.

2. A software application program that must be installed in any remote interactive device compatible with the logic of the present invention capable of communicating with the device 1 and processing the signals sent by said device 1. The software application program must be able to receive the data from a Bluetooth module, to process this data and send it to an audio output system. In particular, said application comprises of an algorithm which performs mathematical operations on the various digital data packets arriving from the device 1, which contain the information obtained from the different measurements detected by each measurement sensor, so that the final result constitutes a well-defined sequence of sound pulses, characterized by a particular tone and/or desired sound effect, thus resulting, for the user's ear, in a composition of musical notes. For this purpose, a library of files is provided, which contains a wide range of tones and digital sound effects to be applied to the particular audio pulse selected by the algorithm. In general, the algorithm creates a relation between the data relating to the detection of the impact—acceleration, speed detected by the accelerometer, angular velocity detected by the gyroscope, inclination and orientation of the device 1 detected by the magnetometer, pressure and impact deformation force detected by appropriate sensors—for the purpose of matching a given combination to a particular tone or a particular sound effect applied to a selected audio pulse. This software program includes a user interface that allows the user to select how the interactive percussive device will controlled the sound reproduce, for example with the adjustment of the height, frequency and duration of a corresponding musical note from the particular audio pulse, and with the choice of a particular audio effect to apply to a musical note. In addition, a user interface is provided that is suitably programmed to display, modify and update, via a Bluetooth connection or cable 10, the instructions that make up the firmware of the electronic board 7 of the device 1.

In general, the entire software program is structured in such a way that, once the system of the present invention has been started, the instant of any external force—deformation, percussion, crushing, throwing, rebounding, shaking, rotation, change of position, variation of speed, both translational and rotational, and acceleration, both translational and rotational—applied to the device 1 determines the trigger (electronic trigger) of a sequence of electrical impulses corresponding to the individual external stress events following the first trigger event and obtained from the various measurement obtained by the sensors arranged in said device 1. Each pulse corresponds to a particular instant of a specific external stress. The interval between one pulse and the next is determined by the interval between an instant and a subsequent instant of external stress. These pulses are transformed, through transducers, in digital bits and sent—in the form of digital bit packages—to the remote interactive device and transformed there—via an appropriate audio interface—into a specific sequence of audio pulses. These audio signals will be picked up and sent to the mixer—in which they will be processed with the addition of certain audio effects—to be transformed and sent to a sound emitting device—for example a speaker—as sound signals.

In particular, the sequence of the resulting audio signals will be sent to the audio output port, possibly wireless, of the remote interactive device for connection to an acoustic diffuser, for example headphones or loudspeakers.

In addition, there is a user interface through which the user can view, edit and record audio tracks, with possible audio effects and simulation of various instruments to obtain an original musical composition, according to a personal taste. This program would behave like a digital audio workstation, complete with analyzer, equalizer, synthesizer and digital mixer, and complete with a graphic interface suitable for the execution of the musical composition. In addition, the application allows you to export the corresponding files of musical compositions in different formats, for example WAV, MP3, FLAC, WMA, AAC. To save the created composition it is necessary to provide a file located in the memory of the remote interactive device. It is not excluded that the saving is made, via Internet connection, on a cloud platform for listening, even in real time, and sharing the compositions created by multiple users on an appropriate interactive platform for a virtual community.

Moreover, this application offers multimedia management tools including the display of presentations on the graphic interface during execution, the recording of the product track, access to the camera in case it is integrated in the remote interactive device, for example smartphone, video recording of the execution, management and playback of audio and video files, as well as visual and sound effects, contained in collection albums, Internet access for sharing, even in real time, audio file and/or video files on a platform for the interactive community.

It is to be understood that the communication between the device 1 and the remote interactive device is possible using the application program developed for the implementation of the present invention, but it is not excluded that conventional DAW (Digital Audio Workstation) processing programs may be used such as Ableton Live, Pro Tools, Logic Pro, Ardor, MusE, and so on.

Furthermore, an identification code is inserted in device 1 to be detected via Bluetooth by the application in use in the remote interactive device.

The adjustment of the measurement settings of the various sensors and the driving of any lighting elements (for example LEDs) contained in the device 1 is put into practice by the application developed for the present invention using any remote interactive device connected to said device 1 via cable 10 or via a Bluetooth connection.

In addition, the application operates in such a way that a given tone or a given audio effect produced corresponds to an activation signal, transmitted via Bluetooth, of a LED of a particular color mounted in the device 1, all synchronized with the visual effects that can be shown on the display interface of the remote interactive device during execution of the implementation of the present invention.

Therefore, during the execution procedure there is a continuous exchange of information between the device 1 and the remote interactive device, allowing the simultaneous execution of the audio reproduction of the digital tracks sent by the device 1, using the display of the remote interactive device that allows the reproduction of images related to the rhythm of the music and the visualization of the various API interfaces (Application Programming Interface), the lighting of the LEDs—used for visual effects—mounted in the device 1, the recording of the audio tracks and the recording of video clips by accessing the camera integrated in the remote interactive device, these audio and video files loaded in the memory of said remote interactive device or in a cloud platform through Internet access, and finally access to an online community platform.

The management of the flow of data exchanged between the device 1 and the remote interactive device takes place through suitable interface protocols, such as the MIDI interface protocol (Musical Instrument Digital Interface). In particular, the MIDI protocol encodes the signals collected during the implementation of the device 1 and transmits them in real time to the relative remote interactive device.

The user interface and sound generation functions are separated respectably in a MIDI controller (input device) and in a synthesizer, or a sampler, with the two devices communicating through a descriptive language of musical execution such as MIDI or Open Sound Control.

The MIDI interface on the remote interactive device assumes the function of a MIDI controller where the commands, that is the modalities of execution of the present invention by the user, translated into MIDI digital messages, travel in real time from the master device (remote interactive device) to the slave devices (device 1 and to various external acoustic devices). Said messages are interpreted and associated to a particular timbre through the software support—contained in the application of the present invention—which can act as a MIDI sequencer to allow execution, modification and recording of a personal musical performance. Based on the external stresses measured, the logic of operation of MIDI messages for the determination of the sound result is characterized by the sending of digital messages containing note number, expressed in values from 0 to 127, and the note length which regulates the dynamicity of the execution, expressed in values from 0 to 127 as well. In addition, the MIDI protocol, among other functions, is used to send CC type messages (Control Change), Pitch Bend, Modulation, and so on.

Figure 6:
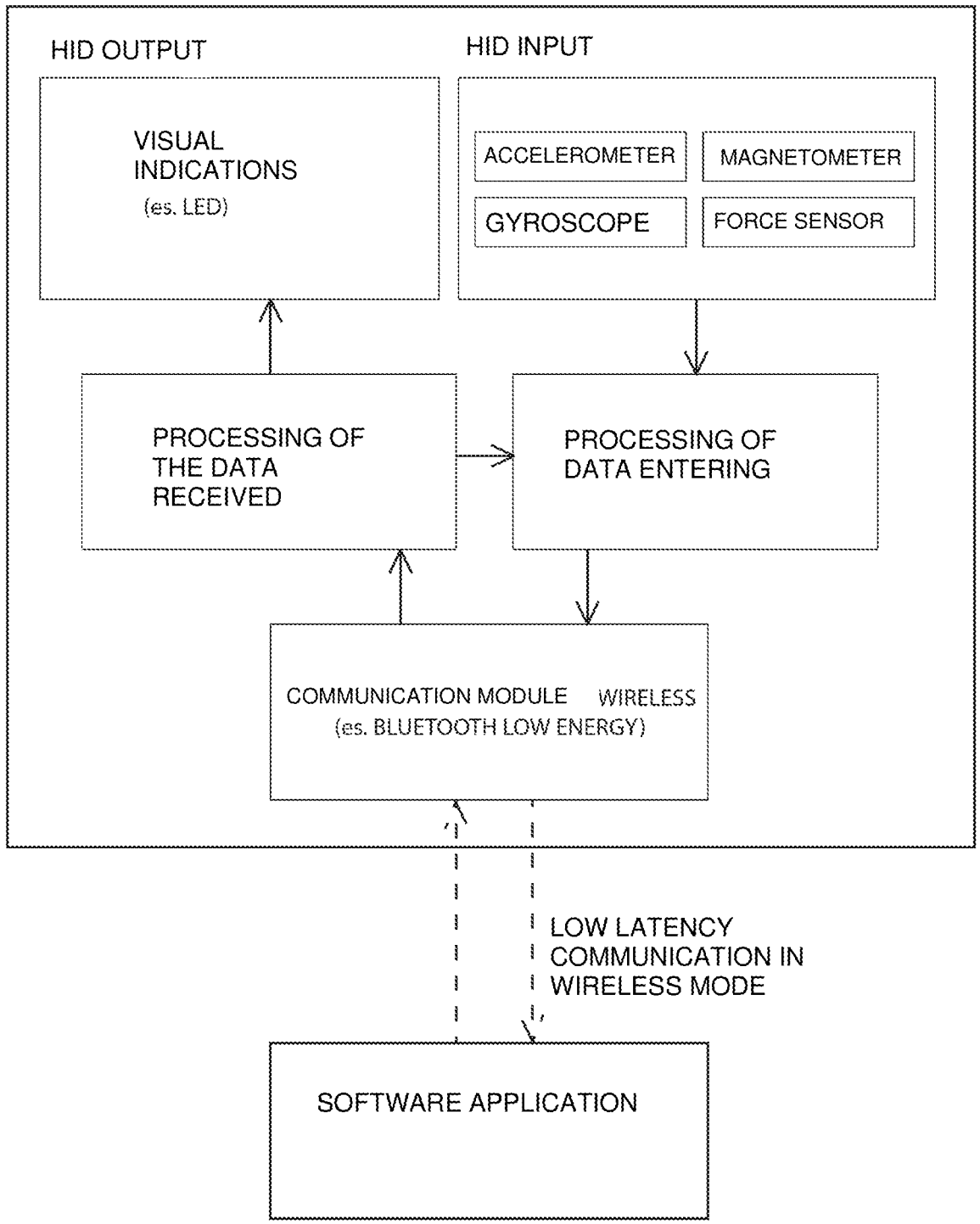
FIG. 6 is a view of the flow chart, which describes the operation according to the present invention.

In general, as it can be understood from FIG. 6, once installed and started, the software program developed exclusively for the present invention on any compatible remote interactive device and operated by the electronic part of the device 1, a system of measurement sensors, among which accelerometers, gyroscopes, magnetometers, altimeter and sensors of force/pressure, detects at different instants of time, a series of measures, including displacement, rotation, translational velocity, angular velocity, translational acceleration, angular acceleration, rotation, inclination, intensity of impact, direction, vibration, deformation, compression, orientation, corresponding to a given external stress applied to the device 1, caused by for example the impact of such device 1 against an object. These analog measurements are translated into digital signals, which are filtered, amplified, processed in a package format according to the protocol of the BLE module and sent by the TX/RX transceiver circuit to the interactive remote device. In turn, said TX/RX circuit receives the commands dictated by the user by means of the interactive application integrated in the remote interactive device for setting the parameters on how to acquire the measurements detected by the sensor system and the control of the elements of lighting in the device 1, in particular LED.

In practice, the device 1 assumes the role of a trigger for music, specifically that is an electronic sensor that transmits the effects of vibration, deformation, rotation, inclination, direction, speed, acceleration, altitude and intensity of impact, due to the impact and the rebound of said device 1, handled by the user, against any object. These effects, by means of a software program, are translated into well-defined sound signals that can be associated to certain musical notes to which specific sound effects have been applied.

For example, the direction of the rebound determines the selection of the type of sound produced, the force measured at the impact determines the duration of the corresponding sound pulse, the compression at specific points of the deformable surface of the outer casing 2 determines the change of pitch or of a particular sound effect and the speed of rotation determines the height—corresponding to the fundamental frequency—of the resulting sound and, therefore, of the particular musical note perceived.

It is clear, therefore, that a specific combination of all the different measurements collected, at different points in time, will produce a specific sequence of sound. Such sequence can be composed of synthesized sounds, which aim to emulate real musical instruments or alternative artificial sounds or a combination of them.

In general, the interactive device 1 can be considered a HID device (Human Interface Device)—developed to interact directly with the user through the interface integrated into the remote interactive device—works as an effective musical instrument—electronic and interactive—for the composition of a musical work.

Therefore, a series of percussions imposed on the device 1 give rise to the triggering of a sequence of sounds, so that, according to the user's agility and experience in handling the device 1, it is possible to obtain pleasing musical compositions.

For a more simplified view, during operation the user activates the device 1 and its connection to the selected remote interactive device. From this moment every interaction with the device 1 is the cause for creating a melody. From a manual compression, from a throw, from an impact with any object of any size, static or dynamic, from a rebound, from a hand catch or from as simple touch, a sequence of notes will be created. The continued use leads to the creation of a real musical composition, characterized by a particular rhythm in relation to the rebound frequency of the device 1 and in relation to the familiarity, skill and creativity expressed by the user. The greater the speed of execution, the greater the rhythm of reproduction. The greater the rebound actions, the greater the audio reproduction of a wide range of assigned sound effects.

As for any musical instrument, the user will need experience in the use of the invention to achieve a performance worthy of approval.

Thus, the user, depending on the way of use, related to a personal style, in the implementation of the present invention, will be the author of an audio composition, which, simple or elaborate, refined or coarse, pleasant or unpleasant, will represent the fruit of his creativity.

In addition, simultaneous execution of several devices connected to the same interactive platform is provided, in order to listen to more compositions and to allow the mixing of said compositions.

Moreover, if the application's MIDI controller, which generates and transmits MIDI data, is activated, various controls and modulations of the music produced can be obtained due to the external stresses, for example a bounce, of the device 1, such as the modification of the time, and therefore—by means of electronic systems for regulating and controlling the music usually known by the state of the art—the speed of execution of the composition, the variation of pitch—Pitch Bend—and other sound effects applied to specific musical notes, corresponding to the translation of the electronic data received from device 1, of the resulting audio composition.

Figure 7:
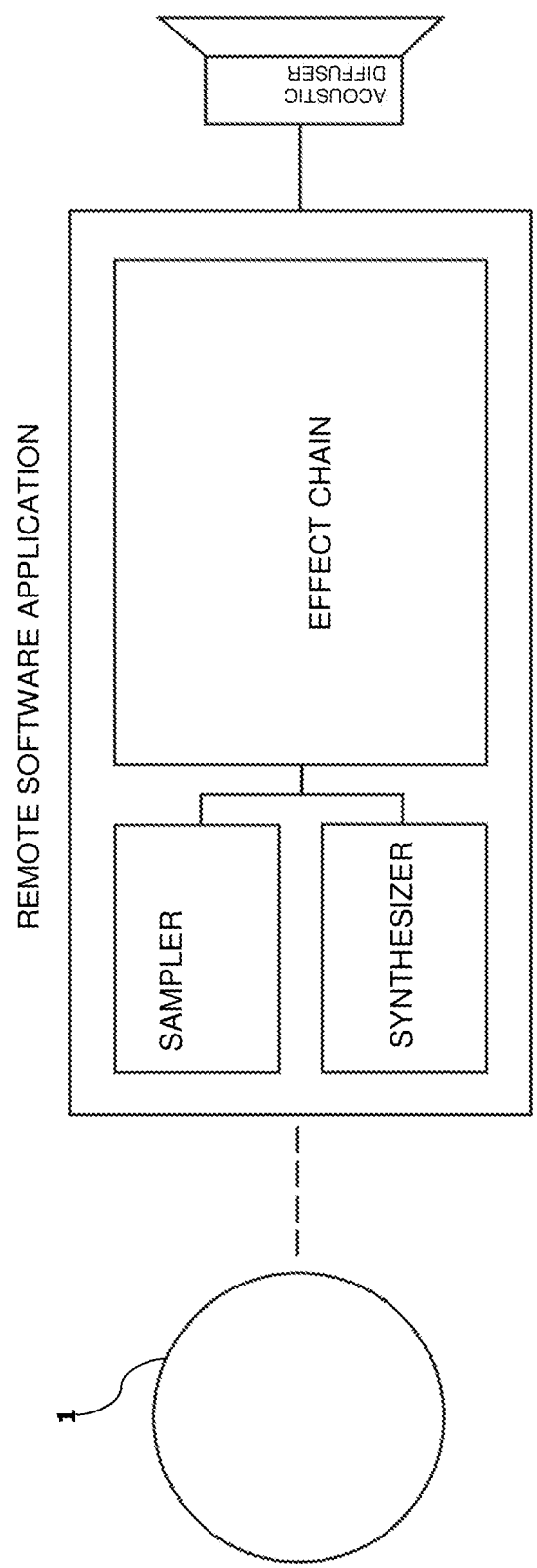
FIG. 7 is a exemplificative diagram of the remote software application according to the present invention.

In Summary, the device 1 behaves as a trigger and controller, where as the remote software application behaves as mere executer of said controls. Specifically, as illustrated by FIG. 7, the remote software application includes a sampler, capable of acquiring the signals sent by device 1 and converting them into appropriate audio samples—corresponding to specific musical notes—and digital synthesizer. Furthermore, it is expected that such musical sequence can be modulated with additional sound effects based on specific user commands, acquired through device 1. For this purpose, it is expected that the synthesizer would use a chain of effects, which can include a variety of electronic musical effects, among which is included for example the playback of additional sounds of musical instruments or particular sounds not existing in nature, the manipulation through audio filters, like equalizer, fuzz, wah wah, the use of effects such as pitch shift, vibrato, harmonizer, the use of modulation effects such as phaser, chorus and flanger, the use of other effects such as delay, reverb, tremolo and panning. Furthermore, the expected playback techniques use not only single sound effects but also backtracks in order to support the performance, in real time, that the user is executing with the device 1. In addition, at least one memory register it is included, whose function is to both archive such sound effects included in the effects chain and to store the resulting musical composition.

Therefore, such remote software application allows the user to configure to his own liking, through specific commands, different types of virtual musical instruments—such as, guitar, violin, tambourine, etc—and/or various sounds and sound effects provided by the synthesizer and by the effect chain, which will be modulate based on the different measurements detected by the sensors of device 1.

For a broader comprehension, some illustrative combination obtained by different applications of device 1 will be described as follows. For example:

the combination of impact and shaking in alternating opposing directions, for example obtained from catching the device with a hand and consequently shaking it, will produce a vibrato effect;

the combination of impact and rotation, for example obtained when device 1 is thrown towards the floor like a yo-yo, will produce a panning effect;

the combination of impact and variation of spinning direction, for example obtained when throwing device 1 toward a tilted wall, will produce a reverb effect;

the combination of impact and variation of altitude, for example obtained by throwing device 1 towards the ceiling, will produce an effect of pitch modulation;

the combination of impact and squeezing/deformation, for example obtained by holding and squeezing device 1 with one hand and tapping it with the other, can produce a wah wah effect.

It is intended that the combinations and the illustrative applications described above are not limiting in the area of the present invention.

Lastly, it is expected that the remote software application also includes a low frequency oscillator (LFO), with the purpose to achieve different effects of modulation.

As is well understood from the above description, the system devised according to the present invention allows achieving perfectly the predetermined purposes.

In fact, the system here described including the interactive percussive device 1 and the associated remote software application is able to translate a series of external stresses and deformation due to impact, squeezing, shaking, rotation and bounce of the ball into playback of different musical sounds diversified by intensity, tone and several effects, thus producing a musical composition created in the user's mind by the specific rhythm obtained in consequence of the mechanical forces applied on such interactive percussive device based on the invention here presented.

It is understood that many modifications may be made to the device, now described as an illustration, which however fall within the scope of protection of the patent. In particular, the outer and inner cases 2.3 may be composed of elements that are not necessarily symmetrical to each other.

In addition, the number of elements making up each of the outer and inner 2.3 cases may be greater than two.

Alternatively, the outer casing 2 may be formed from a single element produced by forging, for example by hot mold, or by 3D printing.

The development of alternative designs that have different shapes from the manifestation described above is not excluded. The device 1 can have a spherical outer surface with a continuous profile or a faceted surface with a polygonal profile—mesh—or polyhedral or furrowed or having any external protuberance. There are manifestations in which the outer casing 2 presents a shaping different from the sphere and which assumes one of the many spheroidal shapes, but it is not excluded that it may exhibit an ellipsoidal, oval shape or the shape of an Archimedean polyhedron or a polyhedron of Catalan or a round-shaped Johnson polyhedron or a Platonic polyhedron.

Furthermore, it is not excluded to consider different manifestations of the invention, which have a different or smaller diameter, even substantially, with respect to the dimension selected in the design of the present invention described herein. Accordingly, the thickness 4 of the outer casing 2 could be quite different from the measurement considered for the described manifestation. In addition, different forms of execution are conceived, which have the inner shell 3 of a different shape from the spherical one, for example polyhedral. The same case is expected for the shape of the internal cavity 5.

In this case, it is not excluded that the electronic board 7 has a different shape, for example square, to be better compatible with the shape of the inner shell 3.

Moreover, it is possible to use a soft spongy material to fill the cavity 5, with the function of protection and shock damping, in order to guarantee the safety of the inner casing 2.

Alternatively, more manifestations of the invention are considered, in which the entire cavity 5 is filled with the same material as the outer casing 2, leaving only the space necessary for the housing of the inner casing 3 and, possibly, of lighting elements, of the recharging system 10, 12 and of the supporting appendices 6, in the case that the latter were made of a different material from the material of the outer casing 2.

Furthermore, the internal frame can have another structure different from the reference panel system 6, maintaining its purpose to support and protect the inner casing 3.

Alternatively, forms of execution that do not have at all the internal framework consisting of appendices 6 are not excluded.

The volume of the cavity 5 may include an inner airtight chamber. In this case, at least one static pressure sensor is provided, directly allocated on the PCBA 7 of the device 1, capable of measuring the pressure variations of the air chamber deformations given by forces applied on various points of the deformable surface of the casing 2, external shell of device 1.

On the contrary, the volume of the cavity 5 can be reduced in order to leave only the space necessary to house the inner casing 3 and the charging system 10,12.

Moreover, the LEDs for the visual effects are housed either in the cavity 5 or on the outer surface of the outer casing 2 and connected to the PCBA 7.

In addition, said LEDs are activated for each external stress applied to the deformable surface of the outer casing 2.

Alternatively, said LEDs are controlled by the software application installed on the remote interactive device.

In addition, the number and arrangement of the batteries may be different from the number and arrangement of the 8,9 batteries used in the preferred manifestation.

Optionally, the method of recharging the batteries 8,9 can take place with alternative solutions, for example by mean of a magnetic induction wireless power supply.

Moreover, the use of a protocol different from the MIDI protocol, which allows the encoding of the data stream processed by the hardware interface of the present invention and transmitted to the hardware interface of the remote interactive device is not to be excluded.

Possibly, any alternative technology to Bluetooth is considered, for example using wireless RF (radio frequency) data transmissions, in particular WiFi technology, but WiMax, HSPA, UMTS, GSM and other data transmission technologies are not excluded. Potentially, an alternative serial communication interface to the USB communication system can be considered.

It is possible that an application software program alternative to the specific software program designed for the present invention is to be installed in the remote interactive device. In particular, it is envisaged that other applications, which contain programs for audio editing, programs for visual effects, programs for interaction with interactive games, may interact with the device 1 of the present invention.

In general, any start/stop system of the device 1 and of the application on the remote interactive device applied to any realization of the present invention is not to be excluded.

Finally, it is provided that the outer casing 2 and/or the cavity 5 have a housing for speakers electrically connected to the electronic card 7 and driven by the software application of the remote interactive device.

It is to be understood, however, not to consider the invention limited to the particular arrangement illustrated above, which constitutes only an exemplary manifestaiton of it, but that various variations are possible, all within the reach of a person skilled in the art, without being outside the scope of protection of the invention itself, as defined by the following claims.

What is claimed is:

1. A percussive interactive device, comprising:
   an external polyhedric or spherical case of deformable material; and
   an internal case within the external case and housing an electronic apparatus,
   wherein the electronic apparatus is configured to detect a set of external forces from at least a rebound effect applied to the electronic apparatus as a result of the external case impacting and deflecting off of a surface external to the external case, to collect electronic data related to the rebound effect, to convert the collected electronic data into converted electronic data related to the rebound effect for subsequent audio application, and to transmit the converted electronic data to remote interactive device, the converted electronic data being configured to be processed by the remote interactive device for emitting related sounds.

2. The percussive interactive device as in claim 1, wherein an internal surface of said external case has ribs defining a stable housing for said electronic apparatus, said stable housing enabling transmission of the external forces to and detection of the external forces by the electronic apparatus.

3. The percussive interactive device as in claim 1, wherein the external and internal cases each are divisible into a respective pair of symmetrical elements, and wherein the symmetrical elements of each pair are permanently connected.

4. The percussive interactive device as in claim 1, wherein the external case is made of an elastomer of high elasticity.

5. The percussive interactive device as in claim 4, wherein the elastomer is made out of a material from the group of silicone, polyurethane, polypropylene, polyvinylchloride and polybutadiene.

6. The percussive interactive device as in claim 5, wherein the elastomer further includes a plasticizer.

7. The percussive interactive device as in claim 1, wherein a cavity disposed between the external case and the internal case is filled with an elastic or spongy material.

8. The percussive interactive device as in claim 1, wherein the electronic apparatus includes a printed circuit board equipped with at least one battery positioned on a top of the board and connected, via an electronic cable, to a data exchange port, which data exchange port is positioned at an external surface of the external case.

9. The percussive interactive device as in claim 8, wherein the printed circuit board is equipped with various electronic measurement sensors, including at least a 3-axis X-Y-Z gyroscope, a 3-axis X-Y-Z accelerometer, an altimeter, and a magnetometer, mounted inside the internal case, and wherein each of at least one force/pressure sensor, at least one proximity sensor, and at least one luminosity sensor are attached to the external surface of the external case or are placed in proximity of a center of mass of the percussive interactive device.

10. The percussive interactive device as in claim 8, wherein the printed circuit board has a circular housing disposed inside the internal case.

11. The percussive interactive device as in claim 1, wherein the external case or a cavity disposed between the internal case and the external case is equipped with light emitting components connected to the printed circuit board.

12. The percussive interactive device as in claim 1, wherein the external case or a cavity disposed between the internal case and the external case is configured to house a sound emitting device connected to the printed circuit board and configured to be controlled by the remote interactive device.

13. A method for processing the external forces detected by the percussive interactive device of claim 1, into electronic data for audio applications, the method including providing the remote interactive device, receiving the converted electronic data at the remote interactive device, processing the converted electronic data into audio signals based on a user's commands provided at the remote interactive device, and transmitting said audio signals to a sound emitting device mounted at or provided in communication with said remote interactive device or said percussive interactive device.

14. The method as in claim 13, further including installing a software application on said remote interactive device and communicatively connecting said software application to said percussive interactive device, wherein the software application provides at least a sampler, a synthesizer and a useable collection of sound effects, and wherein said software application is configured to process the converted electronic data based on the user's commands into processed audio including the audio signals and further incorporating one or more of the sound effects or sounds provided by the synthesizer, together defining a musical composition.

15. The method as in claim 13, further including communicatively connecting a MIDI communication system between said percussive interactive device and the remote interactive device.

16. A percussive interactive system, comprising:
an external polyhedric or spherical case of deformable material;
an internal case disposed within the external case;
an electronic apparatus disposed within the internal case, wherein the electronic apparatus is configured:
to detect a set of external forces defining at least a rebound of the percussive interactive system off of a surface external to the percussive interactive system,
to collect electronic data related to the rebound,
to convert the collected electronic data into converted electronic data related to the rebound for audio application, and
to transmit the converted electronic data; and
a remote interactive device configured to receive and to process the converted electronic data into one or more audio signals related to the rebound,
wherein at least one of the percussive interactive device or the remote interactive device is configured to emit related audible tones based on the one or more audio signals.

* * * * *